United States Patent [19]

Kalu et al.

[11] 4,358,355

[45] Nov. 9, 1982

[54] FOUR COMPONENT AMIDE COPOLYMER

[75] Inventors: Georgina Kalu, Box Hill; Michael Markus, East Melbourne, both of Australia

[73] Assignee: ICI Australia Limited, Melbourne, Australia

[21] Appl. No.: 298,614

[22] Filed: Sep. 2, 1981

Related U.S. Application Data

[63] Continuation of Ser. No. 40,451, May 18, 1979, abandoned.

[30] Foreign Application Priority Data

May 25, 1978 [AU] Australia .............................. PD4511

[51] Int. Cl.$^3$ ................. C08F 220/42; C08F 220/52; C08F 265/10; C08F 220/58
[52] U.S. Cl. ............................. 204/159.16; 525/293; 525/294; 525/296; 525/295; 526/298; 526/304; 526/307; 526/306; 526/274; 526/287
[58] Field of Search .............. 526/298, 307, 304, 306; 525/293, 294, 296; 204/159.16

[56] References Cited

U.S. PATENT DOCUMENTS 3,873,487  3/1975  Minato et al. ...................... 525/221

FOREIGN PATENT DOCUMENTS 998188  7/1965  United Kingdom .
1183456  3/1970  United Kingdom .
1260354  1/1972  United Kingdom .
1312494  4/1973  United Kingdom .
1396531  6/1975  United Kingdom .

*Primary Examiner*—Carman J. Seccuro
*Attorney, Agent, or Firm*—Cushman, Darby & Cushman

[57] ABSTRACT

Polymeric material comprising at least four polymeric constituents which comprise mer units of the following types:
I acrylamide or derivatives thereof
II acrylonitrile or derivatives thereof
III acrylic acid and esters, or derivatives thereof
IV alkylol, sulphonyl or phosphonyl derivatives of I.

The polymeric materials are useful as components of water bearing systems which are in the form of gels or suspensions.

16 Claims, No Drawings

FOUR COMPONENT AMIDE COPOLYMER

This is a continuation, of application Ser. No. 40,451 filed May 18, 1979, now abandoned.

This invention relates to new compositions of matter comprising polymeric material. More particularly, the invention relates to compositions of matter comprising polymeric material which is soluble in aqueous media and which is capable of acting as a thickening or gelling agent in such media. Such compositions are useful in a variety of industrial applications, thus for example they have been found to be extremely valuable in explosives technology, in the metal, mining, textile, cosmetic, pharmaceutical, horticultural and agricultural industries, and to a lesser extent in other industries, where there is a need for thickened or gelled water-based products.

The use of naturally occurring gums as thickening agents for water bearing systems has long been known and typical examples of such gums include gums arabic, gum tragacanth, gum dammar, galactomannan gums such as guar gum, hydroxypropyl guar gum, locust bean gum, and xanthan gums such as the biopolymeric gums. More recently synthetic polymeric substances, for example polyacrylamide, have been used for the same purpose and in the specification of U.S. Pat. No. 4,077,820 it has been disclosed that suitably thickened or suspended aqueous compositions may be derived from the use of copolymers having pol(acrylamide) as a major component and poly(methacryloyl acetone) as a minor component. Such copolymers contain in major proportions acrylamide mer units represented by the formula

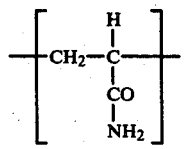

and in minor proportions methacryloyl acetone mer units, represented by the formula

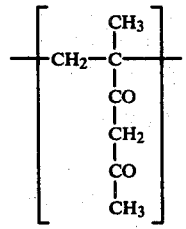

U.S. Pat. No. 4,077,820 also discloses the use of copolymers comprising poly(acrylamide) with a poly(methacryloyl acetone) and either poly(acrylonitrile) or poly(methylmethacrylate) as the minor constituents.

Such polymeric materials are known to form gels in aqueous systems. Gel formation is particularly desirable when undissolved solids are present in a system and must be maintained in a relatively uniform state of dispersion therein. As used herein, a gel is a mixture, one component of which is water, homogeneous down to substantially colloidal dimensions and capable of resisting a finite shearing force. This resistance to shearing is evidence of some sort of continuous mechanical network or structure which, however, can constitute a relatively small fraction of the total mass of the composition of which the gel is a component. Thus the gel forms a matrix in which both dissolved and undissolved components can be distributed. It is commonly desirable that such gels, although they are aqueous in nature, should have a high degree of waterproofness. They are often applied in situations where extraneous water is present and if they are not waterproof they will readily take up water with the consequent destruction of the gel.

Whilst the gums and polymers of the prior art have been reasonably satisfactory as agents for thickening or gelling water bearing systems they have sometimes been found to be deficient in that the degree of thickening or gelation has been hard to control or that in the instances where gels were formed such gels were physically weak and tended to rupture or in instances where electrolytes were present in the water bearing systems the gel structures were prone to collapse. Such deficiencies sometimes led to undesirable segregation of undissolved components in the system and furthermore often resulted in the desired product having a low degree of waterproofness.

We have now found new propenoic copolymers which, when used as thickening or gelling agents in water bearing systems, impart properties to the system such that the deficiencies outlined above are reduced considerably and in some instances such deficiencies may be eliminated.

By propenoic copolymers we mean a copolymer which has some mer units in its molecular structure of the general formula:

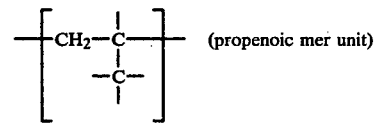 (propenoic mer unit)

this type of mer unit can be conceived as being derived from propenoic acid

$CH_2=CHCOOH$

Accordingly we provide as a new composition of matter copolymeric material comprising at least two polymeric constituents having propenoic mer units in their molecular structures and characterised in that at least one of the said constituents contains a minor proportion of modifying mer units differing from the mer units present in major proportions in the said constituent.

By 'modifying mer units' we mean mer units, the presence of which in minor proportions modifies the properties of the polymeric material, for example properties such as solubility, dispersibility and viscosity.

Conveniently the modifying mer units may be derived from a proportion of the said mer units present in major proportions consequent of chemical treatment of the said constituent, but it lies within the scope of the invention that the modifying mer units may be introduced into the said constituent by other means, for example by simultaneous copolymerisation or a grafting treatment. In a convenient embodiment of the invention all the polymeric constituents of the said polymeric material contain propenoic mer units.

Accordingly we provide as a new composition of matter, suitable for use in gelling aqueous systems, copolymeric material comprising four different types of mer units selected one from each of the types of mer units identified by the following formulae:

Formula I 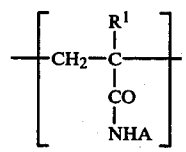 (Acrylamide and derivatives thereof)

Formula II 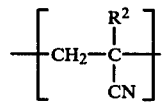 (Acrylonitrile and derivatives thereof)

Formula III 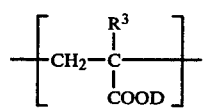 (Acrylicacid and esters, and derivatives thereof)

Formula IV 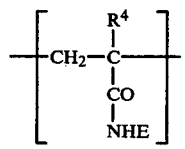 (Hydroxyl alkyl, sulphonyl and phosphonyl derivatives of acrylamide and derivatives thereof)

wherein $R^1$, $R^2$, $R^3$, $R^4$, A and D are independently chosen from the group of radicals consisting of hydrogen, $C_1$ to $C_6$ alkyl radicals, and $C_1$ to $C_6$ hydroxyalkyl radicals; and wherein E is chosen from the group of radicals consisting of $C_1$ to $C_6$ hydroxy alkyl radicals, sulphonyl radicals and phosphonyl radicals.

The new copolymers of this invention may be made by simultaneously copolymerising together, using techniques well known to those skilled in the art, the appropriate monomers and polymers as precursors to supply the characterising types of mer units to the polymeric structure. However it is convenient to prepare the new copolymers by first copolymerising the appropriate precursors for mer units of types I and II, and optionally type III, and then chemically converting a portion of the mer units of type I into mer units of types III and IV. In which case the $R^3$ and $R^4$ radicals will be the same as $R^1$.

Within the limitations already defined for the nature of the mer units in the composition of this invention, the nature of the polymeric constituents is not narrowly critical. Typical precursors, for example, from which the characterising polymeric constituents are prepared are:

(a) For the constituent supplying formula I mer units—acrylamide, and derivatives thereof. Methacrylamide, N-[2-(2-methyl-4-oxodentyl)]acrylamide, N-isopropylacrylamide, N-t-butylacrylamide.

(b) For the constituent supplying formula II mer units—acrylonitrile, methacrylonitrile, 2-(haloalkyl)acrylonitrile, N,N,bis(2-cyanoethyl)acrylamide.

(c) For the constituent supplying formula III mer units—derivatives of 2-methyl propenoic acid (often referred to as methacrylic acid) and typified by the amide thereof, or esters thereof such as the methyl, ethyl, isopropyl or butyl esters. Other monomers useful for this purpose include substituted esters such as dimethylaminoethyl methacrylate, hydroxyethyl methacrylate, 2-acetoacetoxyethyl methacrylate. Also the polymeric constituent characterised by having mer units of formula I.

(d) For the constituent supplying formula IV mer units—hydroxy alkyl, sulphonyl and phosphonyl derivatives of acrylamide, such as N-methylol acrylamide, N-(2-hydroxyethyl)acrylamide, N-(ethoxymethyl)acrylamide. Also the polymeric constituent characterised by having formula I mer units.

In order for the new compositions, as defined within the scope of this invention, to have maximum utility as gelling agents, it is preferable that their polymeric structure contains at least two different polymeric constituents supplying formula III type mer units. Conveniently, one of these polymeric constituents is derived from the formula I polymeric constituent by chemical modification. These sub-types will be referred to as formulae IIIA and IIIB.

So as to facilitate the understanding of the invention reference is made hereinbelow to an embodiment of the invention which is illustrated with reference to table 1.

TABLE 1

| Polymeric constituent | Type of mer unit | Precursor | Process used to convert precursor to polymeric constituent |
|---|---|---|---|
| Major Component | | | |
| Poly-(acrylamide) | Formula I | acrylamide | polymerisation |
| Minor Components | | | |
| Poly-(acrylonitrile) | Formula II | acrylonitrile | polymerisation |
| Poly-acrylic acid | Formula IIIA | acrylic acid poly-(acrylamide) | polymerisation hydrolysis |
| Poly-hydroxyethyl methacrylate) | Formula IIIB | hydroxyethyl methacrylate | polymerisation |
| Poly(N-methylol acrylamide) | Formula IV | poly-(acrylamide) | methylolation |

Accordingly there is provided in this embodiment a new composition of matter which is a copolymeric material comprising as a major component a polymeric constituent derived from acrylamide, and as minor components, a polymeric constituent containing carboxy groups, a polymeric constituent containing methylol groups, a polymeric constituent derived from acrylonitrile and a polymeric constituent derived from a hydroxyalkyl alkacrylate, characterised in that said polymeric constituents containing carboxy groups and methylol groups are derived by chemical treatment of part of the said polymeric constituent derived from acrylamide.

In a preferred embodiment of this copolymeric composition of the invention which comprises as a major component a polymeric constituent derived from acrylamide the said carboxy and methylol groups may be derived from the mer units of acrylamide in a manner such that from about 1 to 15% of the said mer units are converted to mer units containing methylol groups and from about 0.3 to 3% of the said mer units are converted to mer units containing carboxy groups. In another preferred embodiment of the above copolymeric composition the said hydroxyalkyl alkacrylate is conveniently hydroxyethyl methacrylate.

The proportions of the polymeric constituents affect the properties of the composition. If the content of polymer constituent having mer units of the formula I type is less than 65% on a molar basis, the composition will not have the desired water solubility for it to function as a gelling agent in aqueous systems. The maximum content of formula I type polymeric constituent is 98.5% on a molar basis. The preferred proportion of formula I polymeric constituent is in the range of 80% to 95% on a molar basis. The proportion ranges for the polymeric constituents of the compositions of the invention are given in table 2.

TABLE 2

| Polymeric constituents | Composition range - molar % | |
| --- | --- | --- |
| mer unit type | Possible | Preferred |
| Formula I | 65.0 to 98.5 | 80.0 to 95.0 |
| Formula II | 0.5 to 10.0 | 1.0 to 5.0 |
| Formula III(including all sub-types) | 0.5 to 4.0 | 1.0 to 3.5 |
| Formula IV | 0.5 to 25.0 | 1.0 to 12.0 |

The new compositions of matter according to the present invention may be copolymers of the random, block or graft types, or mixtures of these types. They may be made by polymerising together suitable precursors to give all four of the characterising polymeric constituents having the desired mer unit structures or by polymerising together suitable precursors to give a polymeric material containing at least two of the characterising polymeric constituents and then chemically modifying part of one or both of these polymeric constituents into the other two characterising polymeric constituents.

Thus for example the compositions of matter of the invention may be manufactured by processes comprising a procedure whereby a polymeric material comprising mer units of types identified by formulae I and II, is treated in a manner such that there is introduced into the material an amount of mer units which differ from at least some of the original mer units in the material. Conveniently such mer units may be introduced in situ to the material by chemical conversion of the original mer units. Thus in a further embodiment of the invention there is provided a process for making a new composition of matter which process comprises treating polymeric material comprising at least two polymeric constituents having mer units of formula I and formula II type respectively in a manner such that there is introduced into the said polymeric material an amount of mer units which differ from at least some of the original mer units present in the said material. Conveniently, but not essentially, the differing mer units may be derived from a proportion of the mer units present originally in the said material. Methods whereby mer units may be introduced into the polymeric material are known and typically such methods may include hydrolysis, oxidation, reduction, alkylation, amination, grafting and the like. Thus for example mer units comprising amide groups may be treated by hydrolysis to form carboxy groups, or mer units containing ester groups may be treated with solutions of ammonia or amines to form amide groups. In an embodiment of the invention the differing mer units referred to above may differ from some of the original mer units present from one constituent, but be the same as a mer unit present in another constituent. Thus for example a polymeric material containing constituents the mer units of which comprise say amide groups, ester groups and a small proportion of carboxy groups may be treated in a manner such that a proportion of the amide or ester groups may be converted by chemical means to carboxy groups, thus increasing the proportion of carboxy groups in a composition of the invention. In another process a carboxy group bearing material may be grafted on to the polymeric material to increase the proportion of carboxy groups in a composition of the invention. Grafts can be initiated by chemical or radiation free radical sources, ultraviolet light with a photosensitiser or X-rays. In instances where two or more groups in the mer units of the polymeric material could be modified by a chemical treatment such a treatment should be adjusted in a manner, for example by control of reaction conditions such as time or temperature of reaction, pH value of the reaction medium and the like, such that the more susceptible group is modified whilst less susceptible groups are unaffected by the treatment.

Polymeric materials of our invention may be prepared by the well known processes whereby two or more monomers are reacted to form random, block or graft copolymers and thereafter the original copolymer so formed may be treated as hereinabove described to provide within the copolymer an amount of mer units which differ from the mer units in the original copolymer.

In summary, the present invention provides a process for the manufacture of the new compositions of matter as herebefore defined which comprise copolymeric material having at least four different types of mer units in its molecular structure of the types hereinbefore identified by formulae I, II, III and IV, in which process there are at least two steps, not necessarily sequential wherein one step involves copolymerisation of appropriate monomers to yield a copolymeric material comprising mer units of the types identified by formulae I and II. The other step or steps, which provide the means of introducing mer units of types III and IV into the molecular structure, involve the use of simultaneous copolymerisation, graft polymerisation and/or chemical treatment.

The extent to which the polymeric constituent or constituents may be modified can be controlled to provide a composition which is eminently suitable for use for a particular purpose. Thus the extent of modification of a constituent of a composition destined to be used, for example, as a thickening, suspending or gelling agent in an explosive composition may well differ from the extent of modification of a similar composition which was useful as an agent for waterproofing porous products such as paper. Again the composition may be constituted from components which are in proportions eminently suited to impart a certain characteristic to a product with which it was being used, but which needs modification to improve certain other characteristics. Thus for example a composition may contain polymeric components containing mer units comprising carboxy groups and amide groups and it may be desirable to improve the efficacy of the composition by increasing the proportion of carboxy groups in the composition. Such an increased proportion may be simply achieved by treating the composition in a manner that some of the amide groups in the original mer units are converted in situ to carboxy groups to provide a composition of the invention.

We have also found that the capability of thickening or gelling water bearing systems by naturally occurring materials or derivatives thereof is enhanced if such naturally occurring materials or derivatives are reacted with monomers and precursors capable of forming the copolymers of our invention.

Accordingly we provide in yet another embodiment of our invention a water soluble copolymeric composition of matter comprising a copolymeric composition of matter as hereinbefore described and comprising in addition a derivative of a naturally occurring polymeric material capable of thickening or gelling a water bearing system. Such naturally occurring materials which include the naturally occurring polymeric materials per se are well known and include for example hydrophilic gums such as the galactomannans of which guar gum, hydroxypropyl guar gum and locust bean gum are typical examples. Other such materials include polysaccharides such as starch and carbohydrate derivatives such as the xanthan gums prepared by the microbial transformation of carbohydrate material. Typical examples of such derivatives are those products prepared from glucose by treatment with microorganisms of the genus Xanthomonas for example the plant pathogen *Xanthomonas campestris*. Further suitable derivatives of naturally occurring materials include water soluble derivatives of cellulose, for example hydroxyethylcellulose.

As indicated above the polymeric compositions of our invention are suitable for thickening water bearing compositions and accordingly we provide a water bearing composition comprising an amount of a polymeric composition according to our invention sufficient to increase the viscosity of said water bearing composition. The amount of the polymeric composition used for any particular purpose may suitably be determined by simple experimentation. In instances where only a small increase in the viscosity of a water bearing composition is desired amounts of copolymer up to about 3% of the total weight of the composition are suitable; but larger amounts, say up to about 10% may be used if desired. The degree of thickening by an amount of copolymer is also influenced to some extent by the molecular weight of the copolymer used. Thus polymeric material of a relatively low molecular weight, say of the order of 10,000 to 200,000, will provide products which are less viscous than one wherein an equal weight of a copolymer is used and wherein the molecular weight of the polymeric material is in a range from about 500,000 to 1,000,000 or even higher. Such high molecular weight polymers are preferred for many purposes since they provide relatively more viscous solutions per unit weight of copolymer used.

In addition to their capability to increase the viscosity of water bearing compositions, the polymeric compositions of matter according to our invention comprising at least one group capable of reacting with a metal ion also form metal complexes. Such metal complexes are new and accordingly we provide metal complexes wherein the organic component thereof is derived from a copolymer according to our invention. The metal component of such complexes will be dependent on the nature of the metal reactive group in the copolymer but in some cases a range of complexes can be obtained wherein the metallic component is different. We have found that such metal complexes may be prepared by reacting a water soluble copolymer of our invention with an aqueous solution of an appropriate metal salt, optionally in the present of an agent capable of converting the salt to a metallic form. Such a reaction is conveniently performed at ambient temperatures although higher or lower temperatures may be used if desired. From amongst the range of metals which form metal complexes when reacted with our copolymers there may be mentioned water soluble compounds derived from zinc, cerium, aluminium, uranium, titanium, zirconium, lead, tin, vanadium, chromium, manganese or iron. Complexes comprising chromium are very useful.

The above metal derivatives of the copolymers of our invention have been found to be useful agents for gelling water bearing systems particularly such systems containing an electrolyte. By suitable choice of copolymer and metal salt we have prepared a range of gels derived from water based systems wherein the gels are formed over differing periods of time ranging from a few seconds to several weeks after the addition of a copolymer and a metal salt to the water bearing system. Accordingly we provide a gel, as hereinbefore defined, of a water bearing system, preferably a system containing an electrolyte, characterized in that said gel comprises a metal complex derived from a copolymeric composition of matter according to our invention. The amount of the metal complex used in the preparation of the above gel will depend to some extent on the degree of gelation which is desired and to some extent on the nature of the water bearing system and the type of metal complex being used. For many purposes useful gels are obtained when the amount of metal complex in the system being treated is in the range from 0.1 to 10% w/w, more usually from 0.2 to 3% w/w, of the total weight of the system being treated. Varying degrees and rates of gelation of water bearing compositions may be achieved if the polymeric compositions of the invention are incorporated in such a composition in the presence of substances which together form a redox system. A typical redox system is one comprising thiourea and an alkali metal dichromate. By suitable choice of the ratio of the amount of the redox systems to the amount of the polymeric compositions, which latter may also be varied by differing the proportion of modifying mer units therein, the efficacy of the polymeric composition as a gelling, thickening, suspending or water proofing agent may be controlled.

The polymeric compositions of matter, and metal complexes derived therefrom are especially useful for the preparation of gels in water bearing systems comprising inorganic salts for example oxygen releasing salts such as ammonium nitrate, sodium nitrate or calcium nitrate. Thus they are particularly suitable for making explosive compositions such as gelled aqueous blasting agents. Such agents are easier to prepare in so far as the gelling agent is water soluble and does not require to be hydrated as in the instance of the gelled aqueous blasting agents, often referred as explosive slurries, of the prior art. Accordingly in a still further embodiment of our invention we provide a gelled water bearing explosive composition comprising at least one water soluble inorganic oxygen-releasing salt; water; at least one fuel; and from 0.1 to 3% w/w preferably from 0.3 to 1.5% w/w, of the total composition of a gelling agent selected from the group consisting of a polymeric composition according to the invention and metallic derivatives thereof.

In general, except for the gel matrix, the explosive compositions of our invention are of conventional types. The oxygen releasing salts suitable for use in our explosive compositions may be, for example, inorganic nitrates, chlorates and perchlorates and mixtures thereof. We prefer that the oxygen releasing salt material be chosen from the nitrates of the alkali and alkaline earth metals or ammonium and of these we prefer sodium nitrate, ammonium nitrate and calcium nitrate. The amount of oxygen releasing salt in such compositions is not narrowly critical; we have found that compositions containing amounts of oxygen releasing salts from 50% w/w to 99% w/w of the total compositions are satisfactory and amounts from 65% w/w to 85% w/w are preferred. The particle size and shape of the oxygen releasing salt is not critical and is well known from the art of ammonium nitrate manufacture; powders and prilled particles are satisfactory.

The proportion of water in such compositions should be sufficient to dissolve at least part of the oxygen-releasing inorganic salt, at least part of any water soluble fuel which may be present, at least part, preferably all of the gelling agent, and also be sufficient to hydrate at least part preferably all, of any gum component which may be present. Suitably the amount of water present may constitute from 5 to 35% w/w of the composition, but the amount present should not be in excess of the explosive limit of the composition. We prefer that the amount of water be in the range from 5% w/w to 25% w/w of the total composition and more preferably be in the range from 12% w/w to 20% w/w of the total composition.

When referring to fuels or fuel materials in this specification we mean substances which are stable in such explosive compositions, that is prior to explosion, during preparation and storage the substance is chemically inert to the system. The said substances must be combustible and their physical nature should be such that they may be incorporated in our compositions in a manner so as to be uniformly distributed throughout the compositions. Such fuels are well known in the art and they may be organic or inorganic and may also be derived from animal and plants.

The fuels employed in the compositions of this invention can be, for example, self-explosive fuels, non-explosive carbonaceous, non-metallic and metallic fuels or mixtures of the aforementioned types of fuels. They can be varied widely. Examples of self-explosive fuels include one or more organic nitrates, nitrocompounds and nitramines such as trinitrotoluene, cyclotri (or tetra) meythylenetri (or tetra) nitramine, tetryl, pentaerythritol tetranitrate, explosive grade nitrocellulose and nitrostarch.

The self-explosive fuel can be for example in any of the well known flake, crystalline or pelleted forms. In general up to 35% and preferably from 10 to 30% by weight based on the weight of composition of self-explosive fuel may be used.

Suitable water soluble fuels are organic water soluble substances for example urea, carbohydrates such as sugars or molasses, water soluble alcohols or glycols, glues or mixtures of these. Suitably the proportion of water soluble fuel in our compositions is in the range from 0.1 w/w to 10% w/w of the total composition. Amounts from 4% w/w to 7% w/w of the total composition are preferred.

Suitable water insoluble or sparingly water soluble fuels may be chosen from inorganic materials for example sulphur, aluminium, silicon, ferrosilicon, ferrophosphorus, magnesium, titanium, boron, mixtures thereof for example mixtures of aluminium with ferrosilicon, or organic materials for example finely divided charcoal, anthracite, gilsonite, asphalt, fuel oil, cellulosic materials such as sawdust, or cereal products for example flours, dextrins or starches. When the inorganic fuel is a metal it is preferably in granulated or powdered form ranging in particle size from coarse, for example retained on a British standard 30 mesh sieve, to very fine for example passing a British standard 300 mesh sieve. Such granulated or powdered metal may be in the form of discrete regular shaped particles, but metal powders wherein the metal is in the form of irregular shaped particles, or in flakes or in the form of aggregates of particles or flakes are also satisfactory. A preferred metallic fuel is aluminium powder. The proportion of water insoluble or sparingly water soluble non-metallic fuels in such compositions may suitably be in the range from 0.1% w/w to 10% w/w of the total composition and amounts from 4% w/w to 7% w/w of the total composition are preferred. The proportion of metallic water insoluble fuels, when present in such compositions, may be as high as 25% w/w and amounts in the range from 0.5% w/w to 20% w/w of the total compositions are preferred.

Where desirable, it is convenient to add to the slurry explosive compositions of our invention, in amounts expressed as parts by weight per 100 parts by weight of the final mixture, other conventional additives used in slurry explosives. Such additives may include for example anti-foaming agents, for example ethyl hexanol, in amounts ranging e.g. from 0 to 0.1 part; or surfactant, for example non-ionic surfactants such as alkylene oxide condensates of phenols or amides, from 0 to 5 parts. When desired, sensitizers in the form of gas or a mixture of gases such as air may be added to our compositions. Thus it may be added in the form of injected or stirred in air or gas or it may be added as air or gas encapsulated in or attached to the surface of particulate material. Alternatively a gas, such as nitrogen or carbon dioxide, may if desired be generated in the composition by known means. Yet again further sensitizers in the form of modified metallic powders may be added to our explosive compositions. Such modified metallic powders include for example material obtained by reacting aluminium powder with resin acids, rosin and derivatives thereof. Under certain circumstances materials which are capable of controlling the pH of our compositions may be incorporated into our compositions. Typical materials suitable for controlling the pH value of our composition in a range from about 3 to about 7 include acids such as inorganic acids, for example nitric acid, or carboxylic acids such as acetic acid, or alkalis such as sodium hydroxide or potassium hydroxide.

Any gum component of our composition when present may be selected from conventional suspending agents such as are referred to hereinbefore, for example galactomannan gums such as locust bean gum, or guar gum and derivatives thereof like hydroxypropyl guar gum. The amount of gum component which may be incorporated in the explosive compositions of the invention depend to some extent on the nature of the gum component and the composition to which it has been added. Such a gum component when present reinforces the effect of the polymeric materials of the invention to minimize segregation of the insoluble components within or from the compositions, and to provide a matrix which enhances the resistance of the compositions to leaching of the water soluble components by water.

In general terms amounts of gum from as little as 0.1% w/w to as much as 3% w/w of the total weight of our compositions are useful and amounts from 0.5% to 1.5% w/w of the total weight of the composition are satisfactory for most purposes.

The polymeric compositions of matter of the invention are advantageous over similar polymeric compositions of the prior art in that by suitable choice of the amount and type of the differing mer units provided in the compositions by the processes described hereinbefore, it is possible to exercise considerable control on the rate of gelation of a water-bearing system and on the strength of the gel so formed. Furthermore by choice of suitable ratios of the modified and unmodified constituents of the compositions it is possible to provide a gelling agent which is highly compatible with an aqueous system being treated especially in instances where such a system contains electrolytes such as inorganic salts. Furthermore the compositions of the invention impart waterproofing properties to aqueous systems in which they are used, and this aspect is of particular utility in explosive compositions comprising finely divided metallic powders since such powders are less prone to be wetted than in similar compositions which do not contain a polymeric composition of the invention as a component. Yet again our polymeric compositions are easier to use than are the prior art gum-like products, since our polymeric compositions are soluble in water and therefore do not require to be hydrated over a period of time to become effective as is required when gum-like products are used.

These aforementioned advantages will also accrue if the polymeric compositions of the invention are used in other applications where a gelling agent is required. For example, in cementitious slurries, well drilling muds, cosmetic compositions, food thickening, paints.

The invention is now illustrated by, but is not limited to, the following examples in which all parts and percentages are on a weight basis unless otherwise specified. Examples 26 to 31, 33, 34 and 36 do not lie within the invention and are included for the purposes of comparison.

EXAMPLE 1

140 parts of a mixture of monomers of commercially available acrylamide (which contained about 0.5% of acrylic acid), acrylonitrile and hydroxyethyl methacrylate in a molar ratio of 955:35:10 respectively were placed in a reaction vessel fitted with stirring means, heating means, gas inlet and outlet ports and condensing means. The mixture was stirred, 1858 parts of water were added thereto and sufficient sodium hydroxide was added to adjust the pH value of the contents of the reaction vessel to 6.7. A stream of nitrogen gas was bubbled through the contents of the vessel and the temperature of the said contents was adjusted to 50° C. 5 parts of a water soluble azo type initiator, available commercially under the designation V-50, were added to the hot contents, and about 20 minutes after the addition of the initiator the temperature of the contents of the vessel was observed to rise to 60° C. and remained at approximately that value for a further 3 hours. The contents were stirred for a total time of 6 hours after the addition of the initiator. There was thus obtained a solution of precursor polymeric material comprising a copolymer constituted by poly(acrylamide), poly(acrylonitrile) and poly(hydroxyethyl methacrylate) and which had a molecular weight of about 600,000 and which in the form of an aqueous solution containing 7% of the copolymer had a viscosity of 9000 poise. The copolymer so obtained which was a precursor of the polymeric material of the invention contained about 0.5% of poly(acrylic acid). The solution of the precursor polymeric material referred to above was diluted with sufficient water to provide a copolymeric solution containing 4% of solids. 50000 parts of the above copolymeric solution was heated to a temperature of 50° C. in a reaction vessel and to this hot solution there was added aqueous 20% w/v solution of sodium hydroxide sufficient to adjust the pH of the copolymeric solution to a value of 11.2, and secondly 143 parts of an aqueous 40% w/v solution of formaldehyde. The contents of the reaction vessel were stirred for 30 minutes, at which time the pH value of the contents of the vessel was 9.6. The contents of the reaction vessel were cooled to ambient temperature and the pH value thereof adjusted by the addition of a dilute hydrochloric acid solution to 6.7. There was thus obtained a solution containing polymeric material according to the invention and being a modified copolymer of poly(acrylamide), poly(acrylonitrile) and poly(hydroxyethyl methacrylate) in a molar ratio which approximated to 191:7:2 and which contained, as expressed as a percentage of the acrylamide mer units, 4.8% w/w of methylol groups and 1.5% w/w of carboxy groups (see table 3). The copolymeric material was recoverable from the solution by conventional means.

EXAMPLES 2 TO 8 INCLUSIVE

Copolymeric materials according to the present invention, having the compositions given in table 3, were made by the method described in example 1 except that different proportions of monomers were used to produce the solution of precursor polymeric material. The viscosities of aqueous solutions (7.0% w/w) of the copolymeric materials made in examples 1 to 8 inclusive are recorded in table 3.

TABLE 3

| Example No | *Types of mer units in copolymeric material in mol % | | | | | Viscosity Cps. | Molecular Weight |
|---|---|---|---|---|---|---|---|
| | I | II | IIIA | IIIB | IV | | |
| 1 | 90.72 | 3.56 | 1.43 | 1.02 | 3.27 | $9.0 \times 10^5$ | $7.5 \times 10^5$ |
| 2 | 80.0 | 5.0 | 2.50 | — | 12.50 | $9.6 \times 10^4$ | — |
| 3 | 65.0 | 7.5 | 3.00 | — | 25.0 | $2.1 \times 10^4$ | — |
| 4 | 97.0 | 0.5 | 1.50 | — | 1.0 | $1.8 \times 10^6$ | $1.25 \times 10^6$ |
| 5 | 91.0 | 3.0 | 2.0 | — | 4.0 | $7.4 \times 10^5$ | $3.2 \times 10^5$ |
| 6 | 75.0 | 7.0 | 3.0 | | 15.0 | $4.5 \times 10^4$ | — |
| 7 | 65.0 | 10.0 | 3.0 | 1.0 | 21.0 | $1.5 \times 10^4$ | — |
| 8 | 90.0 | 3.5 | 0.75 | 0.75 | 5.0 | $7.5 \times 10^5$ | $8 \times 10^5$ |

TABLE 3-continued

| Example No | *Types of mer units in co-polymeric material in mol % | | | | | Viscosity Cps. | Molecular Weight |
|---|---|---|---|---|---|---|---|
| | I | II | IIIA | IIIB | IV | | |

*Type I mer unit is
$$-\left[CH_2-\underset{\underset{NH_2}{|}}{\underset{|}{\overset{H}{\underset{|}{C}}}\overset{|}{\underset{CO}{}}}\right]-$$

Type II mer unit is
$$-\left[CH_2-\underset{\underset{CN}{|}}{\overset{H}{\underset{|}{C}}}\right]-$$

Type IIIA mer unit is
$$-\left[CH_2-\underset{\underset{COOH}{|}}{\overset{H}{\underset{|}{C}}}\right]-$$

Type IIIB mer unit is
$$-\left[CH_2-\underset{\underset{OCH_2CH_2OH}{|}}{\underset{|}{\underset{C=O}{\overset{CH_3}{\underset{|}{C}}}}}\right]-$$

Type IV mer unit is
$$-\left[CH_2-\underset{\underset{NHCH_2OH}{|}}{\underset{|}{\underset{CO}{\overset{H}{\underset{|}{C}}}}}\right]-$$

EXAMPLE 9

This example illustrates a use for a polymeric material according to the invention wherein the modified copolymer of Example 1 is used as a component in a water-bearing gelled explosive composition.

An explosive composition of a gelled water-bearing type was prepared by mixing the following materials in a mixer used conventionally to prepare water-bearing gelled explosive compositions. A stock solution was prepared by mixing 20,000 parts of ammonium nitrate, 12,500 parts of sodium nitrate, 10,000 parts of water and 400 parts of the modified copolymer of Example 1 and heating the mixture to a temperature of 65° C. To 10,700 parts of the above hot stock solution there was added.

| | |
|---|---|
| Ammonium nitrate | 9125 parts |
| Thiourea | 100 parts |
| Urea | 1463 parts |
| Ethylene glycol | 75 parts |
| Starch | 750 parts |
| Atomized aluminium powder | 1750 parts |

The above materials were stirred, the temperature of the resultant dispersion was reduced to 35° C., and then 100 parts of sodium dichromate, 100 parts of sodium nitrite and 750 parts of paint fine aluminium powder were added to and mixed with the dispersion which was converted to a gel. There was thus obtained a gelled water resistant explosive composition which when pumped did not exhibit any loss of sensitivity to detonation when compared to such sensitivity prior to pumping. Similar compositions were obtained when 10,700 parts of stock solution which had been stored for 7 days was used. The compositions were detonated by conventional means and had a velocity of detonation of 2.9 kilometers per second. The above characteristics were retained by compositions prepared as above and stored for three months at a temperature of 35° C.

EXAMPLES 10 TO 16 INCLUSIVE

These examples illustrate a range of polymeric materials according to the invention the same as or similar to that of Example 1 and wherein the proportion of carboxy groups, as expressed as a percentage of the acrylamide mer units, is varied. The examples also illustrate the variation in time taken for the polymeric material to form a gel in the presence of differing proportions of components of a redox system.

Water bearing gelled explosive compositions were prepared using the general procedure of Example 9 except that the amount of modified copolymer, the proportion of carboxy groups in the modified copolymers expressed a molar percentage of the acrylamide mer units, the amount of thiourea and the amount of sodium dichromate, were varied as shown in Table 4. The amounts of copolymer, thiourea and sodium dichromate are expressed as a percentage of the explosive composition. Table 4 also sets out the time taken for a gel to form after the addition of the sodium dichromate.

TABLE 4

| Example | Carboxy group (%) | % w/w of explosive composition | | | Gel time (minutes) |
|---|---|---|---|---|---|
| | | Copolymer | Thiourea | Sodium dichromate | |
| 10 | 0.3 | 0.4 | 0.4 | 0.4 | 275 |
| 11 | 0.3 | 0.8 | 0.4 | 0.4 | 110 |
| 12 | 1.5 | 0.4 | 0.8 | 0.4 | 45 |
| 13 | 1.5 | 0.8 | 0.4 | 0.8 | 25 |
| 14 | 2.5 | 0.4 | 0.4 | 0.8 | 10 |
| 15 | 2.5 | 0.8 | 0.4 | 0.4 | 5 |
| 16 | 2.5 | 0.8 | 0.8 | 0.4 | 2 |

Each of the explosive compositions of the above examples was detonable.

EXAMPLES 17 TO 25 INCLUSIVE

The general procedure of example 1 was repeated except that the composition of the mixture of monomers used to prepare the precursor polymeric material was varied to contain hydroxyethylmethacrylate in various molar ratios, so that modified copolymers of the compositions shown in table 5 were formed. The viscosities in 7% w/w aqueous solution of these modified copolymers are also recorded in table 5.

TABLE 5

| Example | Formula (mer units in copolymeric material in mol %) | | | | | Viscosity (Cps) | Molecular Weight |
|---|---|---|---|---|---|---|---|
| | I | II | IIIA | IIIB | IV | | |
| 17 | 88.0 | 3.5 | 0.5 | 3.5 | 4.5 | $7.5 \times 10^5$ | $4.75 \times 10^5$ |
| 18 | 88.0 | 3.5 | 1.5 | 2.5 | 4.5 | $6.9 \times 10^5$ | $6.5 \times 10^5$ |
| 19 | 88.0 | 3.5 | 2.5 | 1.5 | 4.5 | $8.1 \times 10^5$ | $7.1 \times 10^5$ |
| 20 | 88.0 | 3.5 | 3.0 | 1.0 | 4.5 | $7.6 \times 10^5$ | $7.4 \times 10^5$ |
| 21 | 64.5 | 10.0 | 1.5 | 2.5 | 21.5 | $1.3 \times 10^4$ | Not determined |
| 22 | 76.0 | 7.5 | 1.5 | 2.5 | 12.5 | $2.0 \times 10^4$ | Not determined |
| 23 | 87.5 | 3.5 | 1.5 | 2.5 | 5.0 | $6.8 \times 10^5$ | $5.8 \times 10^5$ |
| 24 | 89.5 | 3.5 | 1.5 | 0.5 | 5.0 | $7.5 \times 10^5$ | $6.6 \times 10^5$ |
| 25 | 90.0 | 3.5 | 1.5 | — | 5.0 | $9.0 \times 10^5$ | $7.7 \times 10^5$ |

EXAMPLES 26 TO 31 INCLUSIVE

For the purposes of comparison a series of explosive compositions was prepared using the general procedure of Example 9 except that in the present examples there was used 400 parts of the precursor polymeric materials of Examples 17, 18, 19, 20, 23 and 24 to replace the modified copolymer of Example 1. The comparative explosive compositions so obtained were subjected to pumping treatment. It was found that each of the so pumped comparative compositions was less sensitive to detonation than was an explosive composition of Example 9 which had been subjected to such a pumping treatment.

EXAMPLE 32

A hot solution was prepared by mixing 563 parts of ammonium nitrate, 421 parts of water and 16 parts of the modified polymeric material according to the invention and described in Example 1, and heating the components to a temperature of 75° C. and maintaining the composition so formed at that temperature for 22 hours. The viscosity of the hot composition was measured as soon as it was prepared and after it had been stored for 4 and 22 hours. The results obtained are set out in Table 6 and it is apparent that the viscosity of the composition remained substantially constant over the test period and that the polymeric material had not been degraded to any marked extent over the test period.

EXAMPLE 33

For the purposes of comparison the general procedure of Example 32 was repeated except that the polymeric material of that example was replaced by 16 parts of commercially available poly(acrylamide). The results obtained are set out in Table 6 and it is apparent that the poly(acrylamide) ahd been degraded over the test period.

EXAMPLE 34

For the purposes of comparison the general procedure of Example 32 was repeated except that in the present example the amount of ammonium nitrate was increased to 568 parts, the amount of water was increased to 425 parts and the polymeric material was replaced by 7 parts of guar gum. The results obtained are set out in Table 6 and it is apparent that the guar gum had been degraded over the test period.

TABLE 6

| Storage time (hours) | Example 32 Polymer of the invention | Example 33 Polyacrylamide | Example 34 Guar gum |
|---|---|---|---|
| | Viscosity (centipoises) | | |
| 0 | 250 | 1750 | 6080 |
| 4 | 252 | 620 | 5500 |
| 22 | 235 | 35 | 160 |

EXAMPLE 35

This example illustrates the efficacy of a polymeric material of the invention as a water proofing agent for an explosive composition. By conventional means a gelled water-bearing explosive composition was prepared from the following materials:

| | |
|---|---|
| Ammonium nitrate | 6896 parts |
| Water | 2039 parts |
| Fuel Oil | 260 parts |
| Aluminium powder (passing 150 mesh) | 700 parts |
| Thiourea | 14 parts |
| Modified copolymer of Example 1 | 43 parts |
| 1:2:Sodium nitrate:water solution | 18 parts |
| Potassium dichromate | 30 parts |

156 parts of the above composition were placed in a mesh basket and immersed for 30 minutes in water at a temperature of 40° C. After removing the mesh basket and its residual contents the water was agitated to form a uniform solution and was analysed for its ammonium nitrate content. It was found that 14% of the ammonium nitrate which was present originally in the explosive composition had been leached from the composition.

EXAMPLE 36

For the purposes of comparison the general procedure of Example 35 was repeated except that the copolymer of that example was replaced by a conventional gelling agent consisting of a mixture of 36 parts of guar gum and 7 parts of a xanthan gum available commercially under the designation "Biopolymer XB23". It was found that 33% of the ammonium nitrate in this comparative explosive composition had been leached from the composition.

EXAMPLES 37 TO 41 INCLUSIVE

In these examples the general procedure of Example 1 was repeated except that the amount of the solution of formaldehyde was varied as shown in Table 7 and this variation resulted in the manufacture of a range of polymeric materials according to the invention and which contained differing percentages of methylol groups as expressed as a percentage of the acrylamide mer units. The percentage of methylol groups and the viscosity of an aqueous solution containing 7% of the polymeric material are set out in Table 7. The aqueous solutions relating to Examples 37 and 38 were virtually unchanged after being stored for six months. The polymeric material of Example 39 changed to a self-crosslinked form about one day after manufacture, whilst in the instance of the polymeric material of Examples 40 and 41 some crosslinking of the material occurred during manufacture. The products of Examples 39, 40 and 41 exhibited elasticity and could be deformed under tension but returned to their original form when the tension was removed.

TABLE 7

| Example No | Formaldehyde solution (parts) | Methylol groups w/w % | Viscosity (Cps) |
|---|---|---|---|
| 37 | 40 | 1.25 | $5.8 \times 10^5$ |
| 38 | 70 | 2.5 | $6.1 \times 10^5$ |
| 39 | 235 | 7.5 | $1.9 \times 10^5$ |
| 40 | 365 | 12.5 | $8.7 \times 10^4$ |
| 41 | 800 | 25.0 | $3.4 \times 10^4$ |

EXAMPLES 42 TO 46 INCLUSIVE

In these examples the general procedure of Example 1 was repeated except that the volume of the solution of sodium hydroxide which was added to the precursor solution was varied as shown in Table 8, and this variation resulted in the manufacture of a range of polymeric materials according to the invention and which contained differing percentages of carboxy groups as expressed as a percentage of the acrylamide mer units. The percentage of carboxy groups is set out in Table 8. Table 8 also shows the time taken to form a gelled explosive of the type described in Example 2 when the modified copolymer of Example 1 is replaced by 400 parts of a modified copolymer of each of Examples 42 to 46 inclusive.

TABLE 8

| Example No | Sodium hydroxide solution (parts) | Carboxy groups w/w % | Gelation time (minutes) |
|---|---|---|---|
| 42 | 150 | 0.3 | 250 |
| 43 | 300 | 0.5 | 150 |
| 44 | 750 | 1.0 | 90 |
| 45 | 1500 | 2.5 | 8 |
| 46 | 2000 | 4.0 | >2 |

We claim:
1. A water-soluble copolymer consisting essentially of:
(a) from 65.0 to 98.5 mole percent of repeating units of formula I

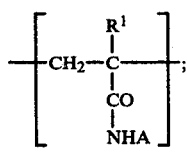

(b) from 0.5 to 10.0 mole percent of repeating units of formula II

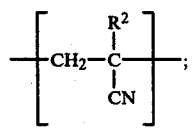

(c) from 0.5 to 4.0 mole percent of repeating units of formula III

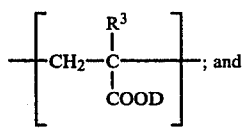

(d) from 0.5 to 25.0 mole percent of repeating units of formula IV

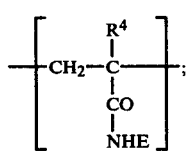

wherein in the formulae $R^1$, $R^2$, $R^3$, $R^4$ and D are independently chosen from hydrogen, $C_1$ to $C_6$ alkyl and $C_1$ to $C_6$ hydroxyalkyl; A is chosen from hydrogen and $C_1$ to $C_6$ alkyl; and E is $C_1$ to $C_6$ hydroxyalkyl.

2. A copolymer according to claim 1 wherein said repeating units of formula III comprise two sub-types of formulae IIIA

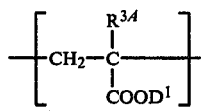

and IIIB

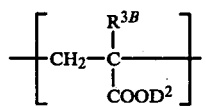

wherein $R^{3A}$ and $R^{3B}$ may be the same or different and $D^1$ and $D^2$ are different.

3. A copolymer according to claim 1 wherein said $R^1$, $R^3$ and $R^4$ radicals are the same.

4. A copolymer according to claim 1 wherein the repeating units of formula I type are the mer units of poly(acrylamide).

5. A copolymer according to claim 1 wherein the repeating units of formula II type are the repeating units of poly(acrylonitrile).

6. A copolymer according to claim 1 wherein the repeating units of formula III type are of a type selected from the repeating units of the group of polymers consisting of poly(acrylic acid) and poly(hydroxyethylmethacrylate).

7. A copolymer according to claim 2 wherein the repeating units of formula IIIA type are the mer units of poly(acrylic acid) and the repeating units of the formula IIIB type are the repeating units of poly(hydroxyethylmethacrylate).

8. A copolymer according to claim 1 which comprises from 80.0 to 95.0 mole percent of a repeating unit of formula I.

9. A copolymer according to claim 1 which comprises from 1.0 to 5.0 mole percent of a repeating unit of formula II.

10. A copolymer according to claim 1 which comprises from 1.0 to 3.5 mole percent of a repeating unit of formula III.

11. A copolymer according to claim 1 which comprises from 1.0 to 12.0 mole percent of a repeating unit of formula IV.

12. A water soluble copolymer comprising
(a) from 80.0 to 95.0 mole percent of repeating units of formula

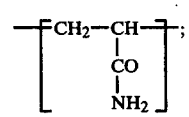

(b) from 1.0 to 5.0 mole percent of repeating units of formula

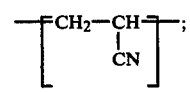

(c) from 0.5 to 3.5 mole percent of repeating units of formulae

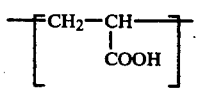

and

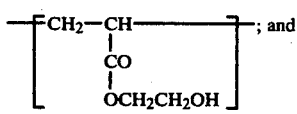

(d) from 1.0 to 12.0 mole percent of repeating units of formula

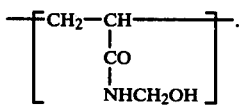

13. A copolymer according to claim 1 selected from the group consisting of random copolymers, block copolymers and graft copolymers.

14. A process for the preparation of a copolymer as defined according to claim 1 which process comprises either:
(a) copolymerizing an appropriate mixture of monomers; or
(b) copolymerizing a mixture of monomers to give a precursor copolymer comprising at least the repeating units of formula I and formula II, as defined according to claim 34, and modifying said precursor copolymer by graft copolymerization or chemical treatment to introduce repeating units of formula III and formula IV, as defined according to claim 1.

15. A process according to claim 14 wherein said chemical treatment is effected by a method selected from the group of methods consisting of hydrolysis, esterification, hydroxy-alkylation, amination.

16. A process according to claim 14 wherein said graft polymerisation is effected by using a chemical free radical initiator or radiation initiation.

* * * * *